Oct. 13, 1936.  S. J. M. SCHANTZ  2,057,060
METHOD OF AND A DEVICE FOR APPLYING ADHESIVE TAPE TO CONTAINERS
Filed Dec. 12, 1935  4 Sheets-Sheet 1

INVENTOR.
Socrates J. M. Schantz
BY
Corbett Mahoney
ATTORNEYS

Oct. 13, 1936.   S. J. M. SCHANTZ   2,057,060
METHOD OF AND A DEVICE FOR APPLYING ADHESIVE TAPE TO CONTAINERS
Filed Dec. 12, 1935   4 Sheets-Sheet 2

INVENTOR.
Socrates J. M. Schantz.
BY
ATTORNEYS.

Oct. 13, 1936.    S. J. M. SCHANTZ    2,057,060
METHOD OF AND A DEVICE FOR APPLYING ADHESIVE TAPE TO CONTAINERS
Filed Dec. 12, 1935    4 Sheets-Sheet 3

INVENTOR.
Socrates J. M. Schantz.
BY
ATTORNEYS.

Oct. 13, 1936.  S. J. M. SCHANTZ  2,057,060
METHOD OF AND A DEVICE FOR APPLYING ADHESIVE TAPE TO CONTAINERS
Filed Dec. 12, 1935  4 Sheets-Sheet 4

INVENTOR.
Socrates J. M. Schantz
BY
ATTORNEYS.

Patented Oct. 13, 1936

2,057,060

UNITED STATES PATENT OFFICE 2,057,060

METHOD OF AND A DEVICE FOR APPLYING ADHESIVE TAPE TO CONTAINERS

Socrates J. M. Schantz, St. Louis, Mo., assignor to The Container Company, Van Wert, Ohio, a corporation of Ohio Application December 12, 1935, Serial No. 54,124

27 Claims. (Cl. 216—29)

My invention relates to a method of and a device for applying adhesive tape to containers. It has to do, more particularly, with a method of and a device for applying adhesive or gummed tape to cylindrical containers of fiberboard or like material and of that type consisting of a cylindrical body portion and a cylindrical closure member which slips down over the upper end of the body portion, in order to maintain the closure member in position on the body portion and to seal the container.

In sealing containers of the type indicated, comprising a body portion and a closure member that slips down over the body portion, it is common to use gummed or adhesive tape. This tape is moistened and is wound around the container in overlapping relation to the joint between the closure member of the container and the body portion thereof. In the past it has been necessary to do this by hand. This has been difficult because it is hard to handle the sticky tape. Also, it is hard to apply the tape to the container by hand in such a manner that all portions thereof are pressed against the surface to which it is applied so that it will uniformly and firmly stick to said surface. It is especially difficult to apply the tape to the container when the closure member is larger in diameter than the body portion and there is a substantial shoulder formed at the joint between the closure member and the body portion. Furthermore, applying the tape to containers by the hand method is very slow and is, therefore, unsatisfactory. Also, this method is unsatisfactory for various other reasons.

One of the objects of my invention is to provide a method for applying gummed or adhesive tape to containers of the type indicated which is much more efficient and much more satisfactory than the hand method heretofore employed for this purpose.

Another object of my invention is to provide a simple and inexpensive device for carrying out my method which is of such a nature that the tape may be applied to the container very rapidly and in such a manner that all portions thereof are properly moistened and pressed against the surface to which it is applied so that it will uniformly and firmly stick to said surface.

Another object of my invention is to provide a method and device which is particularly applicable to applying gummed tape to containers of the type indicated wherein the closure member is slightly larger in diameter than the body portion and there is a substantial shoulder formed at the joint between the closure member and the body portion.

In its preferred form my invention contemplates the provision of a tape-applying device which comprises a main frame of annular form which is adapted to fit over the container to which the tape is applied. This annular frame carries a plurality of pressure rollers adapted to contact with the side of the container at the joint between the closure member and the body portion thereof. The frame also carries a device for holding a roll of tape and for simultaneously moistening it as it is unwound from the roll. Mechanism is also provided for cutting the tape at the proper time. In the initial operation of the device the free end of the tape is pressed against the container in overlapping relation to the joint between the closure member and the body portion so that it will adhere thereto. Then it is merely necessary to rotate the entire device on the container in order to cause the tape to automatically feed from the device and to be pressed against the side of the container in overlapping relation to the joint between the closure member and the body portion and extending completely around the circumference of the container. The rollers which press the tape against the container are so formed and so located relative to each other that the top portion of the tape is first pressed against the closure member and then subsequently the bottom portion of the tape is pressed against the body portion of the container. This prevents the tape from following a helical path around the container when the closure member is slightly larger in diameter than the body portion of the container. When the tape has been wound once or a number of times around the container, the mechanism for cutting the tape may be operated in order to sever it from the roll.

In the accompanying drawings I illustrate the device which I preferably use in applying the tape to the containers. In these drawings like characters of reference designate corresponding parts and:

Figure 1:
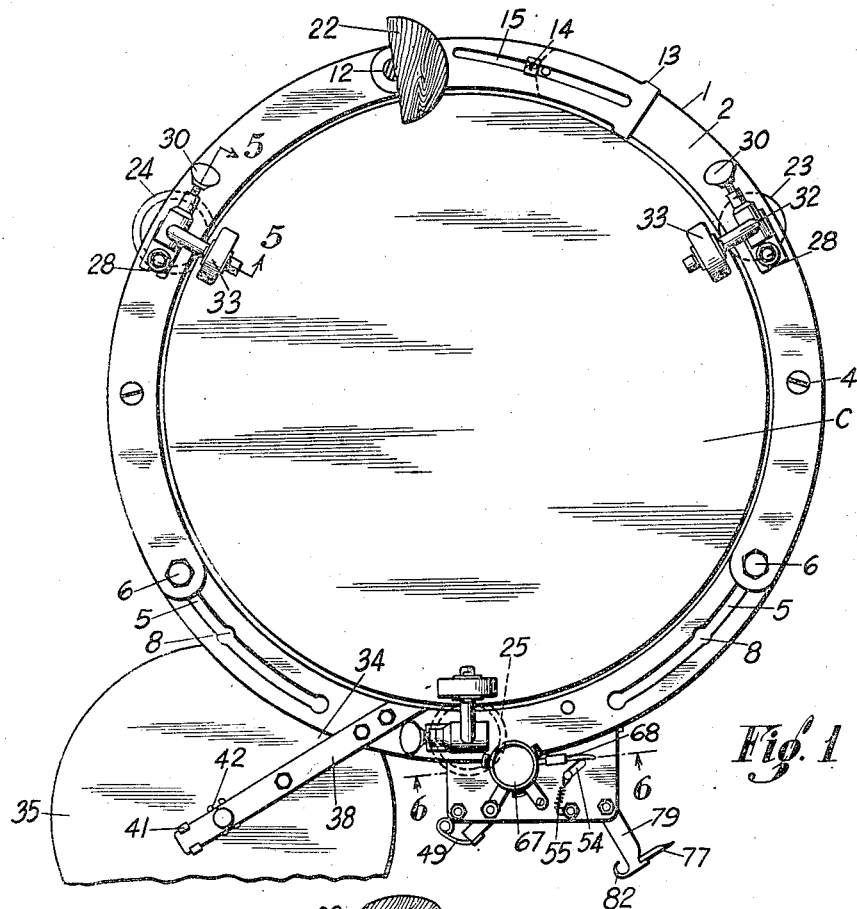
Figure 1 is a plan view of my tape-applying device.
Figure 2:
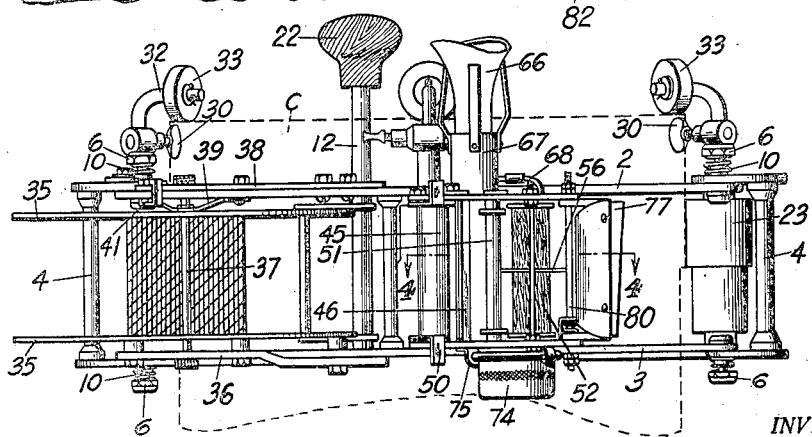
Figure 2 is a side elevation of the device illustrated in Figure 1 and illustrating by dotted lines how the container will be located within the device when it is used for applying tape thereto.
Figure 11:
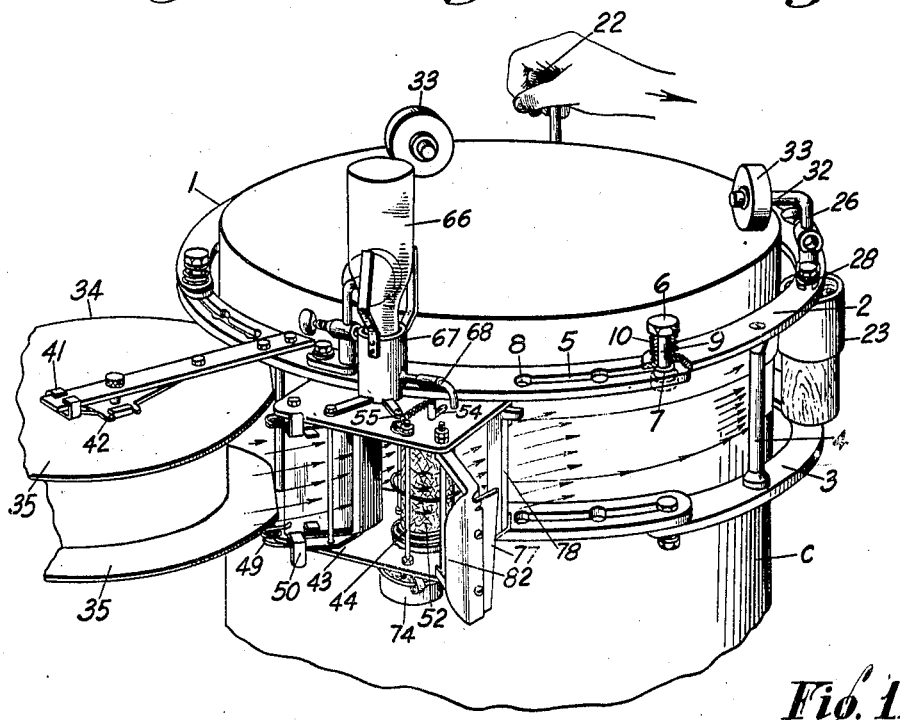
Figure 11 is a perspective view, illustrating my tape-applying device in position on a container and illustrating by the arrows the direction in which it is rotated to apply the tape to the container.

With reference to the drawings and particularly to Figures 1, 2 and 11, I illustrate my device as comprising a main frame 1 of annular form. This frame consists of a top ring member 2 and a bottom ring 3. The rings 2 and 3 are spaced apart vertically and are held in spaced relation by a plurality of spacer members 4 which are arranged at circumferentially spaced intervals. This annular frame 1 is adapted to be fitted over cylindrical drums or containers of the type previously described. It is desirable to provide means for changing the circumference of this frame so that the device may be used for applying the tape to containers of various diameters. Therefore, as illustrated best in Figures 1 and 11, the annular frame is made in a number of sections. The adjacent sections are joined together by bolt and slot connections 5 (Figures 1 and 11).

Each bolt 6 of the bolt and slot connections 5 has an enlarged portion 7 adjacent its inner end which is adapted to fit into any of a plurality of enlarged openings 8 formed at spaced intervals along the slot. The bolt 6 also has a narrow portion 9 that may slide through the slot. A spring 10 is provided in surrounding relation to the outer portion of the bolt and normally tends to hold the bolt in its outermost position so that the enlargement 7 thereon will snap into the opening 8. However, the bolt may be pressed inwardly against the force of the spring so that the smaller portion 9 thereof will lie in the slot. It will be apparent that a pair of these bolts and slot connections are provided at each joint between the adjacent ends of the various sections of the frame in order to connect the sections of the top and bottom rings thereof together. The enlargement 7 on each bolt is normally in one of the openings 8. However, in order to adjust the circumference of the frame, it is necessary to press the two bolts, at the joint between two of the sections, inwardly to displace the enlargements 7 thereon from the vertically aligning pair of openings 8. This will bring the reduced portions 9 of the pair of bolts in the corresponding slots. Then it will be possible to slide the bolts through the slots until the enlargements 7 thereon snap into a different pair of the openings 8. Thus, it is possible to readily change the circumference of the annular frame and to maintain it until it is desired to change it again.

Figure 7:
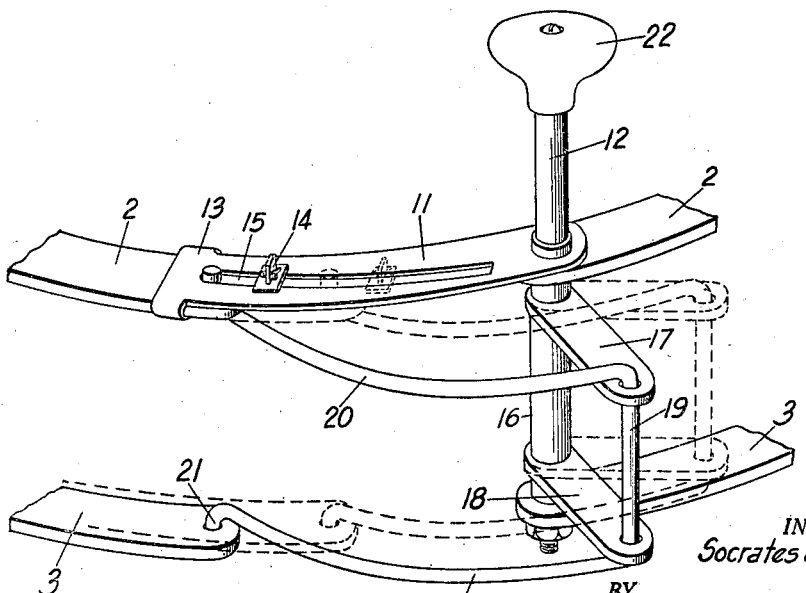
Figure 7 is a detail illustrating mechanism which is employed for changing the circumference of the annular frame to facilitate positioning of the device on the container and removal of it therefrom.

The mechanism just described is adapted to be employed for changing the circumference of the annular frame in order that the device may be used on containers of various diameters. However, it is also desirable to provide other mechanism for quickly enlarging the circumference of the annular frame and then bringing it back to its original size in order to facilitate application of the device to a container and removal of it therefrom. Therefore, I provide the mechanism illustrated in Figure 7.

As shown in this figure, the adjacent ends of two of the sections of the annular frame are spaced apart. These ends, however, are joined together in such a manner that the distance therebetween may be varied in order to cause variation in the circumference of the frame. They are joined together by a flat curved link 11 which is pivoted to a pin 12 carried at the end of one of the sections of the frame. The other end of the link 11 has a yoke 13 that embraces the top ring 2 of the other section and permits the ring 2 to slide back and forth therein. The extreme end of the section of the ring 2 carriers a guide 14 that operates in a slot 15 of arcuate form which is formed in the link 11. The pin 12 is vertically disposed and is mounted in the ends of the sections of the rings 2 and 3, as shown. It has a sleeve member 16 rotatably mounted thereon between the rings 2 and 3. This sleeve 16 has a pair of arms 17 and 18 keyed thereto and extending radially therefrom. A member 19 passes through openings formed in the outer ends of these rods. This member 19 has a pair of horizontally extending link portions 20 of arcuate form which have substantially the same curvature as the sections of the annular frame. The outer end of the lower link portion 20 is downwardly turned as at 21 and passes through an opening in the end of the section of the ring 3 and is free to rotate therein. The outer end of the other link portion 20 is similarly upwardly turned and passes upwardly through an opening in the end of the section of the ring 2 and through the slot 15 in the link 11. The upper end of the pin 12 has a handle 22 formed thereon.

The operation of this mechanism will be readily understood. When the parts are in the full line positions indicated in Figure 7, the annular form has been expanded to increase its circumference so that it may be readily slipped over a container. However, when it is positioned on the container, the vertical portion of the member 19 may be grasped with the hand and the arms 17 and 18 will be swung inwardly as indicated by the dotted lines. This will cause the link portions 20 to draw the ends of the sections of the annular frame closer together, as illustrated by the dotted lines. The portions 20 will move inwardly until they strike the pin 12 and the various parts will tend to stay in these positions until the arms 17 and 18 are again swung outwardly to the full line positions indicated in this figure. Thus, the annular frame will be contracted around the container. Only three pressure rollers are provided and the circumference of the frame 1 is initially adjusted, by adjusting the various sections thereof relative to each other through the medium of the bolt and slot connections 5, in such a manner that when the device is placed over the container and the frame is contracted by the mechanism just described, all three of the rollers will firmly contact with the sides of the container.

Figure 5:
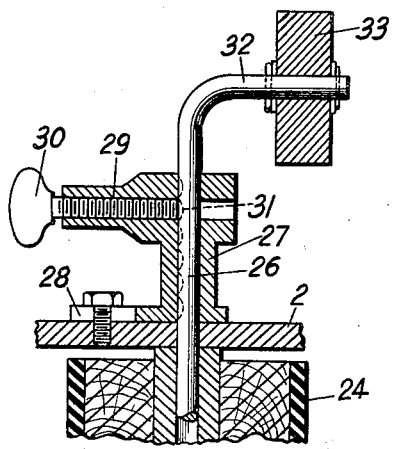
Figure 5 is a detail in vertical section showing how each of the pressure rollers and the roller for positioning the pressure roller in overlapping relation to the joint between the closure and body portion of the container are mounted on the annular frame.

As shown best in Figure 1, the annular frame 1 has three pressure rollers 23, 24 and 25, rotatably mounted thereon at equally spaced positions around the circumference thereof. These rollers, as will later appear, are adapted to contact with the tape to press it against the sides of the container. The mounting for each of the rollers is illustrated best in Figure 5. Each roller is rotatably mounted on the lower end of a shaft 26. This shaft has its extreme lower end journaled in a bearing on the lower ring 3 of the frame. The upper end is rotatably mounted in a bearing member 27 which is secured to the upper ring 2 by a screw-bolt and slot connection 28. This bearing 27 also has a transverse opening 29 into which a set-screw 30 is threaded. The inner end of this set-screw is adapted to project into any of a plurality of vertical spaced sockets 31 formed in the shaft 26. The upper end of this shaft 26 is bent inwardly at right angles as at 32 and has a roller 33 mounted thereon. The rollers 33 are adapted to rest on top of the container, as indicated in Figures 2 and 11, when the device is slipped on over the container. The rollers 33 may be adjusted to any desired height relative to the pressure rollers 23, 24 and 25, by releasing the set-screw 30 and adjusting the shaft 26 in bearing 27 and again setting the set-screw to hold the shaft in adjusted position. The rollers 33 should be adjusted to such a vertical position that when the device is placed over the container and they contact with the top thereof to prevent further downward movement of the device relative to the container, the pressure rollers 23, 24 and 25 will lie in overlapping relation to the joint between the closure member and the body portion. The distance at which the joint between the closure member and the body portion lies from the top of the container will vary with various containers. However, the rollers 33 may always be adjusted to the proper vertical position in order to position the pressure rollers in overlapping relation to the joint.

Figure 3:
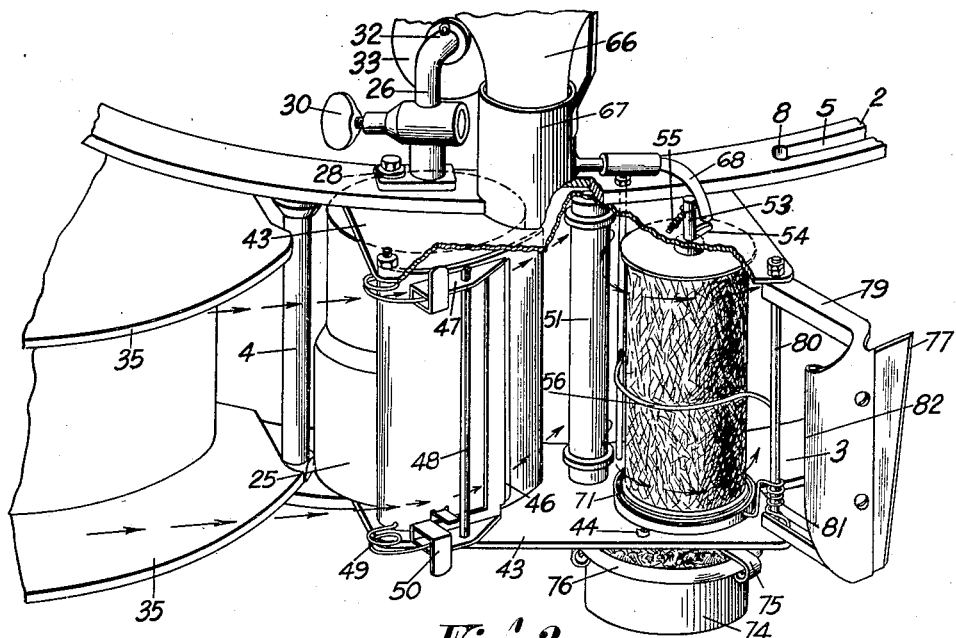
Figure 3 is a detail in perspective of the tape-guiding and moistening device and the shears for cutting the tape.

Adjacent the pressure roller 25, I provide a device 34 for supporting a roll of the gummed or adhesive tape. As shown best in Figures 2, 3 and 11, this device comprises a pair of vertically spaced disks 35 between which the roll of tape is adapted to be disposed. The lower disk 35 is immovably secured to a support 36 which has its inner end bolted or otherwise rigidly secured to the lower ring 3 of the frame 1. The upper disk 35 is free to move vertically on a removable shaft or spindle 37 upon which the roll of tape is adapted to be disposed. This shaft 37 has its lower end rotatably mounted in the support 36 and its upper end rotatably mounted in a similar support 38 which has its outer end rigidly secured to the upper ring 2 of the frame 1. The supports 36 and 38 are parallel with each other. A spring member 39 of the shape shown best in Figure 11 has its one end rigidly secured beneath the member 38 and its opposite end shaped to embrace the member 38 as at 41 and being free to slide relative thereto. This spring has an opening through which the shaft 37 passes. The spring 39 presses downwardly on the disk 35 to which it is secured, as at 42, and causes the disk to press against the upper side of the roll of tape in order to tend to prevent unwinding of the tape.

Figure 4:
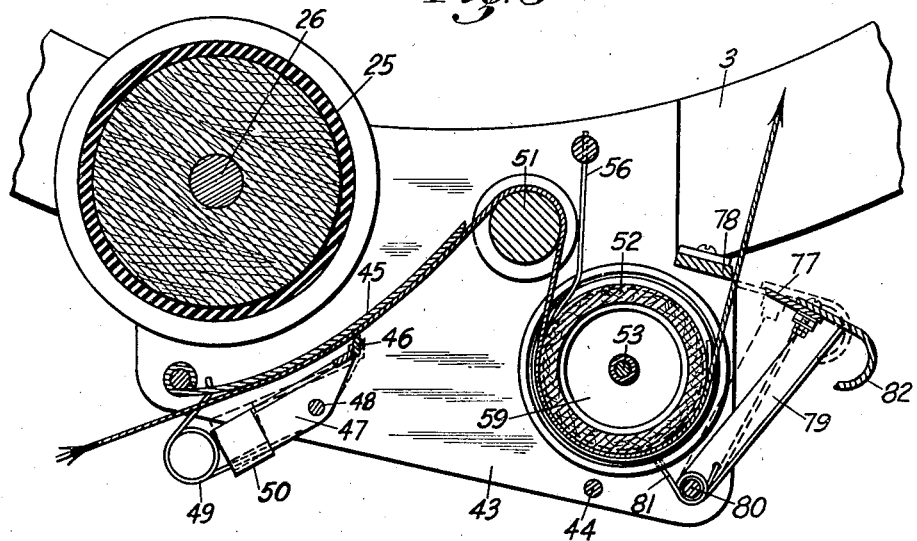
Figure 4 is a detail in horizontal section of the mechanism illustrated in Figure 3 and taken substantially on line 4—4 of Figure 2 and showing how the tape passes therethrough.

Adjacent the tape-holding device, I mount on the annular frame 1 mechanism which will guide the tape, moisten it, and cut it. As shown best in Figures 2, 3 and 11, this mechanism is supported on a pair of vertically spaced plates 43 which have their inner edges secured to the rings 2 and 3 of the frame. The outer edges are held in spaced relation by spacer bolts 44. As shown best in Figures 3 and 4, an inwardly extending curved guide-plate 45 is provided between the two plates and when the tape is unwound from the roll it is adapted to pass against this plate, as illustrated in Figure 4, and by the arrows in Figures 3 and 11. In order to prevent the tape from unwinding too quickly and for keeping it taut, I provide a braking device. This device comprises a blade 46 which is vertically disposed and which is mounted on arms 47 that are free to rock on a bolt 48 mounted on the plates 43. Springs 49 are provided for engaging portions 50 formed on the rear ends of the arms 47 and these springs tend to normally urge the blade 46 against the guide-plate 45 with considerable pressure. Thus, this device will frictionally engage the tape which is passed between the plate 45 and the blade 46 and will prevent the tape from unwinding too quickly. The portions 50 are so shaped that the arms 47 may be rocked around bolt 48 by pressing inwardly on these portions with the fingers. This will cause the blade 46 to swing away from plate 45 and permit free passage of the tape between these two members.

The tape is adapted to pass inwardly around a guide roller 51 disposed adjacent the inner end of the plate 45. It then passes outwardly around a tape-moistening roller 52. This tape-moistening roller 52 is mounted on a shaft 53 which has its ends mounted in slots 54 formed in the plates 43. Small springs 55 are provided which normally tend to keep the ends of the shaft in the outer ends of the slots 54. This structure also aids in keeping the tape taut. A spring wire 56 is provided which is bent around the roller 52 and which normally tends to keep the tape spaced slightly from the tape-moistening roller so that it will not adhere thereto when the device is inoperative for some time.

Figure 6:
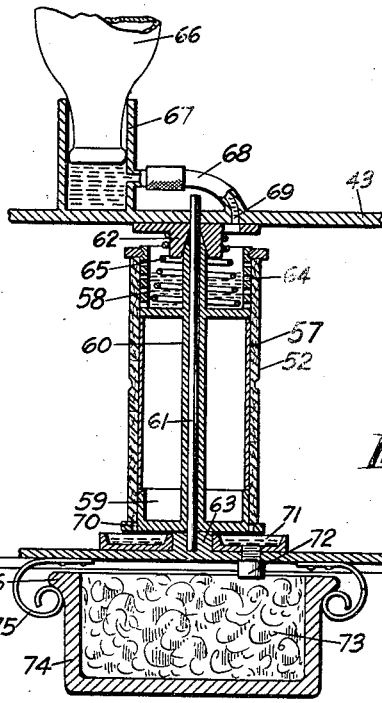
Figure 6 is a detail in vertical section of the device for moistening the gummed or adhesive tape.

The tape-moistening roller 52 and the moisture supplying unit is illustrated best in Figure 6. The roller 52 comprises a cylindrical shell 57 of moisture absorbing material reinforced by a metal shell. The upper end of this shell fits over a cup member 58 and the lower end fits over a cup member 59, both of which are secured to a sleeve 60 through which the roller shaft 61 passes. This shaft 61 is mounted on the plates 43 by means of bearings 62 and 63. The cup 58 has a perforated side wall 64. Within the cup 58 and disposed in surrounding relation to bearing 62 is a coil spring 65. This spring serves as a brake to prevent the roller 52 from rotating too rapidly.

The means for supplying moisture to the roller comprises a bottle 66 which has the neck thereof disposed in a socket member 67 secured to the upper plate 43. A short conduit 68 is provided for conveying the water from the socket member 67 through an opening 69 in the upper plate 43 and permitting it to drop downwardly into the cup 58. The water in the cup 58 will seep through the side wall of the cup and will be absorbed by the shell 57 of the roller 52. Excess moisture will pass down between the edge of cup 59 and the lower end of shell 57 and drop through small openings 70 into a trough-like portion 71. From this portion 71 it will pass through an opening 72 in the lower plate 43 and into a chamber 73 which is filled with absorbent material and is formed within a cup member 74. The cup member 74 is removably held in position beneath the plate 43 by means of springs 75 that cooperate with a bead 76 on the upper edge of cup 74.

After the tape passes around the moistening roller 52 it passes inwardly between blades 77 and 78 of shears which I provide for cutting the tape. The blade 78 is immovably mounted. However, the blade 77 is mounted on the outer ends of arms 79 which have their inner ends mounted for rocking movement on a bolt 80. The blade 77 has its cutting edge inclined (Figure 3) so that it will progressively cut through the tape. Springs 81 are provided which surround bolt 80 and have their free ends pressing against the arms 79 so as to normally urge the arms and the blade 77 carried thereby to the outermost position illustrated in Figure 3. A handle member 82 is provided for facilitating swinging of the blade 77 inwardly against the tape so that it will cooperate with blade 78 in cutting the tape.

Figures 8, 9, 10:
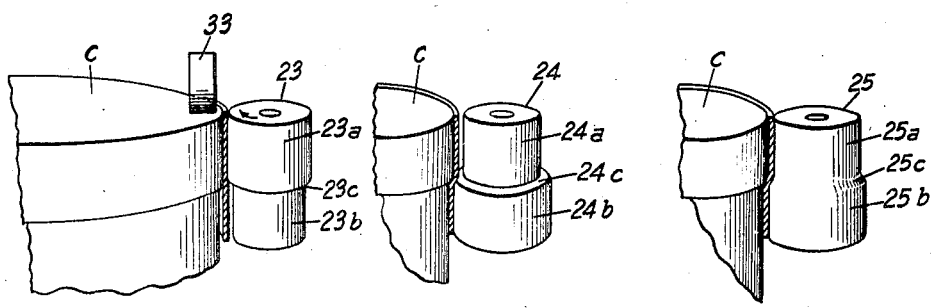
Figures 8 to 10 are more or less diagrammatical views illustrating successive steps in the application of the tape to a container with my device.

The pressure rollers 23, 24 and 25, as previously described, are adapted to contact with the tape and press it against the sides of the container in overlapping relation to the joint between the closure member and the body portion. As will be explained more fully later, the roller 23 will first contact with the tape, then the roller 24 will contact therewith, and finally the roller 25 will contact therewith. The roller 23 is illustrated in Figure 8 and its upper half 23a is of substantially greater diameter than the lower half 23b, forming a sharp shoulder 23c. The roller 24 is illustrated in Figure 9 and its upper half 24a is of substantially less diameter than the lower half 24b, forming a sharp shoulder 24c. The roller 25 is illustrated in Figure 10 and the difference in diameter between the smaller upper half 25a and the lower half 25b is not as great as in the other instances, forming an inclined shoulder 25c.

To use my device, it is placed over the upper end of a container C, as illustrated in Figures 2 and 11. The rollers 33 are adjusted to such a vertical position relative to the pressure rollers 23, 24 and 25, that these pressure rollers will be disposed at the proper level so that they overlap the joint between the closure member and the body portion of the container. The rollers 33 will rest on the upper end of the container and, consequently, limit downward movement of the device on the container. Before positioning the device on the container, however, the member 19 and associated parts are swung into the positions illustrated in Figure 7. This causes the frame 1 to be expanded so that it may be readily passed over the container. When the device is positioned on the container, the member 19 and associated parts are swung into the positions indicated by the dotted lines in Figure 7. This will cause the frame to be contracted around the container. Of course, before the device is used, the various sections of the frame 1 are adjusted relative to each other by means of the bolt and slot connections 5 in order that the frame will have the proper circumference, depending upon the circumference of the container to be sealed.

With the device in position on the container, as illustrated in Figure 11, and the tape threaded through the device, as illustrated in Figure 4, it is merely necessary to pull the moist tape with the fingers a slight distance and to stick the free end thereof to the wall of the container in overlapping relation to the point between the closure member and the body portion. Then it is necessary merely to grasp the handle 22 with one hand and to rotate the device on the container in the direction illustrated by the arrow in Figure 11. This causes the tape to unwind from the roll and to be pulled through the guiding means and around the moistening roller 52, as indicated by the arrows in Figure 4. As the tape is progressively unwound from the roll, during rotation of the device on the container, the various pressure rollers contact therewith and press it firmly against the sides of the container, causing it to firmly adhere thereto. As soon as one or more layers of the tape have been applied to the container in overlapping relation to the joint, the blade 77 of the shears may be swung inwardly into cooperating relation with the blade 78 in order to sever the tape. Then, the end of the tape is pressed against the container with the fingers. As soon as the tape is severed, the springs 55 which always tend to keep the shaft 53 in the outer ends of slots 54 and thereby keep the tape taut, will move the shaft completely to the outer ends of said slots. Also, when the tape is severed, the spring 56 will move it away from the moistening roller 52 so that it will not adhere thereto even though the device is not used for some time. The spring 56 also functions to keep the end of the tape in position for feeding between the shear blades, since the spring tends to move into contact with bolt 80, and consequently, the tape will be held between the spring and the bolt. The device may then be removed by expanding the frame, as previously described, and lifting it off the upper end of the container. Then it may be placed on another container.

The container C which I have illustrated in the drawings has a closure member which slips down over the body portion. The closure member is slightly larger in diameter than the body portion of the container. I have found that if rollers of the same diameter throughout the height thereof are used to press the tape against the side of the container in order to cause it to adhere thereto, it will tend to follow a helical path around the container and the lower half of the tape will not be firmly pressed against the body portion. Therefore, each of the rollers is preferably formed as illustrated in Figures 8, 9 and 10.

Figure 12:
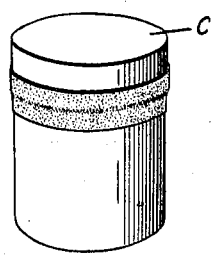
Figure 12 is a perspective view of a container which has had the tape applied thereto in overlapping relation to the joint between the body portion and the closure member thereof by my device.

As previously stated, the roller 23 will be the first to contact with the tape upon rotation of the device on the container. The upper half 23a of this roller will press the upper half only of the tape against the side of the closure member and cause it to adhere thereto. The lower half 23b will not function at all. As the device is rotated further relative to the container and the tape is progressively applied thereto, the roller 24 will next contact with the tape. The lower half 24b of this roller will press the lower half only of the tape against the side of the body portion of the container. The upper half 24a will not function at all. The roller 25, as rotation of the device on the container is continued, will next contact with the tape. This roller, however, is so constructed that both its upper and lower halves will contact with the upper and lower halves of the tape and press it against the closure member and body portion respectively. Thus, the upper half of the tape is first applied to the closure member and subsequently the lower half of the tape is applied to the body portion. This prevents the tape from following a helical path around the container and insures that both the upper half of the tape will be firmly pressed against the closure member and the lower half of the tape will be firmly pressed against the body portion so that the tape will firmly adhere to both the closure member and the body portion. In Figure 12, I have illustrated a container to which tape has been applied by using my device.

It will be apparent from the above description that I have provided a method for applying gummed or adhesive tape to containers of the type indicated which is much more efficient and much more satisfactory than the hand method heretofore employed for this purpose. The device which I use in applying the tape to the container is of such a nature that the tape may be applied to the container very rapidly and in such a manner that all portions thereof are properly moistened and pressed against the surface to which it is applied so that it will uniformly and firmly stick to said surface. The device which I use is of a simple structure and is inexpensive to manufacture. Furthermore, it requires little or no skill to use the device.

Having thus described my invention, what I claim is:

1. A device for applying tape to articles of the type indicated comprising a frame adapted to be positioned in surrounding relation to the article and to be rotated relative thereto, means on said frame for carrying the tape, and means carried by the frame for progressively applying the tape to the article as the article and the device are rotated relative to each other.

2. A device for applying gummed or adhesive tape to articles of the type indicated comprising a frame adapted to be positioned in surrounding relation to the article and to be rotated relative thereto, means on said frame for carrying the tape, means on the frame for moistening the tape, and means carried by the unit for progressively applying the tape to the article as the article and the device are rotated relative to each other.

3. A device for applying gummed or adhesive tape to articles of the type indicated comprising a frame adapted to be positioned in surrounding relation to the article and to be rotated relative thereto, means on said frame for carrying the tape, means on the frame for moistening the tape, means carried by the unit for progressively applying the tape to the article and pressing it thereagainst as the article and the device are rotated relative to each other, and means carried by the frame for cutting the tape.

4. A device for applying tape to containers comprising a unit adapted to be placed on the container in surrounding relation thereto and to be rotated relative thereto, a tape-carrying member carried by said unit, and means for progressively applying the tape to the container as the said unit and the container are rotated relative to each other.

5. A device for applying tape to cylindrical containers comprising a frame of annular form adapted to be placed over the container and to be rotated relative thereto, means on said frame for carrying and guiding the tape, and means carried by the annular frame for progressively applying the tape to the container as the frame and the container are rotated relative to each other.

6. A device for applying tape to cylindrical containers comprising a frame of annular form adapted to be placed over the container and to be rotated relative thereto, means on said frame for carrying and guiding the tape, means carried by the annular frame for progressively applying the tape to the container as the frame and the container are rotated relative to each other, and means carried by the frame for cutting the tape.

7. A device for applying gummed tape to cylindrical containers comprising a frame of annular form adapted to be placed over the container and to be rotated relative thereto, means on said frame for carrying and guiding the tape, means carried by the frame for progressively applying the tape to the container as the frame and the container are rotated relative to each other, and means carried by the frame for progressively moistening the tape as the frame and the container are rotated relative to each other.

8. A device for applying gummed tape to cylindrical containers comprising a frame of annular form adapted to be placed over the container and to be rotated relative thereto, means on said frame for carrying and guiding the tape, means carried by the frame for progressively applying the tape to the container as the frame and the container are rotated relative to each other, means carried by the frame for progressively moistening the tape as the frame and the container are rotated relative to each other, and means carried by the frame for cutting the tape.

9. A device for applying tape to cylindrical containers comprising a frame of annular form adapted to be placed over the container and to be rotated relative thereto, means for varying the circumference of said annular frame, means on said frame for carrying and guiding the tape, and means carried by the annular frame for progressively applying the tape to the container as the frame and the container are rotated relative to each other.

10. A device for applying tape to cylindrical containers comprising a frame of annular form adapted to be placed over the container and to be rotated relative thereto, means for varying the circumference of said annular frame so that the device may be used on containers of various diameters, and other means for varying the circumference of said frame to facilitate positioning of the device on the container or removal of it therefrom, and means carried by the annular frame for progressively applying the tape to the container as the frame and the container are rotated relative to each other.

11. A device for applying tape to cylindrical containers comprising a frame of annular form adapted to be placed over the container and to be rotated relative thereto, means for varying the circumference of said frame, means on said frame for carrying and guiding the tape, means carried by the frame for progressively applying the tape to the container as the frame and the container are rotated relative to each other, and means carried by the frame for cutting the tape.

12. A device for applying gummed tape to cylindrical containers comprising a frame of annular form adapted to be placed over the container and to be rotated relative thereto, means for varying the circumference of said frame, means on said frame for carrying and guiding the tape, means carried by the frame for progressively applying the tape to the container as the frame and the container are rotated relative to each other, and means carried by the frame for simultaneously moistening the tape.

13. A device for applying tape to cylindrical containers of the type indicated in overlapping relation to the joint between the cylindrical body portion and the cylindrical closure member comprising a frame of annular form adapted to be placed over the container, a plurality of rollers carried by the frame for progressively applying the tape to the container as the frame and the container are rotated relative to each other, and means carried by the frame for cooperating with said container to position said rollers in overlapping relation to the joint between the body portion and the closure member of said container.

14. A device for applying gummed tape to cylindrical containers of the type indicated in overlapping relation to the joint between the cylindrical body portion and the cylindrical closure member comprising a frame of annular form adapted to be placed over the container, means on said frame for carrying and guiding the tape, a plurality of pressure rollers carried by the frame for contacting with the tape and for progressively pressing it against the container as the frame and the container are rotated relative to each other, and rollers carried by the frame and contacting with the upper end of said container in order to position said pressure rollers in overlapping relation to the joint between the body portion and the closure member of said container.

15. A device for applying gummed tape to cylindrical containers of the type indicated in overlapping relation to the joint between the cylindrical body portion and the cylindrical closure member comprising a frame of annular form adapted to be placed over the container and to be rotated relative thereto, means on said frame for carrying and guiding the tape, a plurality of pressure rollers carried by the frame for contacting with the tape and for progressively pressing it against the container as the frame and the container are rotated relative to each other, and rollers carried by the frame and contacting with the upper end of said container in order to position said pressure rollers in overlapping relation to the joint between the body portion and the closure member of said container, said last-named roller members being vertically adjustable.

16. A device for applying gummed tape to cylindrical containers of the type indicated in overlapping relation to the joint between the cylindrical body portion and the cylindrical closure member comprising a frame of annular form adapted to be placed over the container and to be rotated relative thereto, means for varying the diameter of said frame, means on said frame for carrying and guiding the tape, a plurality of pressure rollers carried by the frame for contacting with the tape and for progressively pressing it against the container as the container and frame are rotated relative to each other, means carried by the frame for moistening the tape before it is pressed against the container, and rollers carried by the frame and contacting with the upper end of said container in order to position said pressure rollers in overlapping relation to the joint between the body portion and the closure member of said container.

17. A device for applying gummed tape to containers in overlapping relation to the joint between the body portion and the closure member and wherein a shoulder is formed at the joint, comprising a unit adapted to be positioned in cooperative relation to the container and to be moved relative thereto, pressure means on said unit adapted to press the tape against the side of the container, said pressure means being so formed that a portion thereof will first press a part of the tape against the closure member and then another portion thereof will subsequently press the other portion of the tape against the body portion thereof.

18. A device for applying gummed tape to cylindrical containers in overlapping relation to the joint between the body portion and the closure member and wherein a shoulder is formed at the joint, comprising a unit adapted to be positioned on the container and to be rotated relative thereto, pressure rollers carried by the unit for contacting with the tape and pressing it against the sides of the container, said pressure rollers being so formed and arranged relative to each other that the roller which first contacts with the tape will press a portion thereof against the closure member and the roller which contacts therewith subsequently will press the other portion thereof against the body portion.

19. A device for applying gummed tape to cylindrical containers in overlapping relation to the joint between the body portion and the closure portion and wherein the portions are of different diameters, comprising a unit adapted to be positioned on the container, pressure rollers carried by the unit for contacting with the tape and pressing it against the sides of the container and adapted to be revolved around the container, said pressure rollers being so formed and arranged relative to each other that the roller which first contacts with the tape will press a portion thereof against one portion of the container and the roller which contacts therewith subsequently will press the other portion thereof against the other portion of the container.

20. A device for applying tape to articles of the type indicated comprising a unit adapted to be positioned in cooperative relation to the article, said unit carrying a plurality of pressure rollers adapted to be moved relative to the article to progressively apply the tape thereto, said rollers being adjustable relative to each other so that the device may be used on articles of various sizes.

21. A device for applying tape to articles of the type indicated comprising a unit adapted to be positioned in cooperative relation to the article, said unit carrying a plurality of pressure members adapted to be moved relative to the article to progressively apply the tape thereto, said pressure members being adjustable relative to each other so that the device may be used on articles of various sizes.

22. A device for applying gummed tape to curved containers of the type indicated in overlapping relation to the joint between the body portion and the closure portion thereof, comprising a unit adapted to be positioned in cooperative relation to the container, a plurality of pressure members carried by said unit and adapted to be revolved around the container to progressively press the tape against the side of the container, said pressure members being so located that the tape will be applied over said joint and around the container, said pressure members being so formed and arranged relative to each other that the pressure member which first contacts with the tape will press a part of the width of the tape against one portion of the container and the pressure member which contacts therewith subsequently will press the other part of the width of the tape against the other portion of the container.

23. A device for applying gummed tape to curved containers in overlapping relation to the joint between the body portion and closure member thereof comprising means for progressively pressing the tape against the side of the container, said means comprising a plurality of pressure rollers adapted to be revolved about the container, said pressure rollers being arranged at circumferentially spaced intervals around the container.

24. A device for applying gummed tape to containers of the type indicated in overlapping relation to the joint between the body portion and the closure member thereof, comprising a unit adapted to be positioned in cooperative relation to the container, pressure means carried by said unit and adapted to be moved around the container to progressively press the tape against the side of the container and around the container, said pressure means being so located that the tape will be applied over said joint, said pressure means being so constructed that a portion thereof will first press a part of the width of the tape against one portion of the container and subsequently another portion thereof will press the other part of the width of the tape against the other portion of the container.

25. The method of applying gummed tape to cylindrical containers in overlapping relation to the joint between the body portion and the closure portion thereof which are of different diameters, which comprises moistening the tape and progressively applying it to the side of the container and around the container in overlapping relation to said joint in such a manner that part of the width of the tape is first applied to one portion of the container and the other part of the width of the tape is subsequently applied to the other portion of the container.

26. The method of applying gummed tape to containers of the type described having a body portion and a closure portion with a shoulder formed at the joint therebetween, which comprises moistening the tape and progressively applying it to the side of the container and around the container in overlapping relation to said joint in such a manner that part of the width of the tape is first applied to one portion of the container and the other part of the width of the tape is subsequently applied to the other portion of the container.

27. A device for applying gummed tape to containers of the type described comprising means for progressively pressing the tape against the side of the container in order to apply it around the container, said means comprising a unit adapted to be positioned in cooperative relation to the container, a plurality of pressure members adapted to be revolved around the container carried by said unit, said pressure members being arranged at spaced intervals on said unit so that they will be spaced around the container.

SOCRATES J. M. SCHANTZ.

CERTIFICATE OF CORRECTION.

Patent No. 2,057,060. October 13, 1936.

SOCRATES J. M. SCHANTZ.

It is hereby certified that error appears in the printed specification of the above numbered patent requiring correction as follows: Page 5, first column, lines 45 and 55, claims 2 and 3 respectively, for the word "unit" read frame; and that the said Letters Patent should be read with these corrections therein that the same may conform to the record of the case in the Patent Office.

Signed and sealed this 22nd day of December, A. D. 1936.

Henry Van Arsdale (Seal) Acting Commissioner of Patents.